United States Patent [19]

Brandt

[11] 4,150,929

[45] Apr. 24, 1979

[54] RIBBON CABLE EXTRUSION APPARATUS

[75] Inventor: Adolf W. Brandt, Stratford, Conn.

[73] Assignee: B & H Tool Company, Inc., Bridgeport, Conn.

[21] Appl. No.: 808,979

[22] Filed: Jun. 22, 1977

[51] Int. Cl.$^2$ ............................................. B29F 3/04
[52] U.S. Cl. ................................. 425/114; 425/190; 425/380; 425/466
[58] Field of Search ............... 425/113, 114, 381, 466, 425/467, 380, 190, 192 R; 264/172, 174

[56] References Cited

U.S. PATENT DOCUMENTS

| | | | |
|---|---|---|---|
| 3,112,527 | 12/1963 | Pankratz et al. | 425/466 |
| 3,461,501 | 8/1969 | Stewart | 425/466 |
| 3,752,614 | 8/1973 | Bremer | 425/466 X |
| 3,758,247 | 9/1973 | Deegen | 264/172 X |
| 3,776,670 | 12/1973 | Antioletti et al. | 425/114 |
| 4,081,232 | 3/1978 | Pemberton et al. | 425/113 X |

Primary Examiner—Roy Lake
Assistant Examiner—Mark Rosenbaum
Attorney, Agent, or Firm—Mattern, Ware, Davis & Stoltz

[57] ABSTRACT

In a ribbon cable extrusion die assembly, a large plurality of fine electrical conductor wires, numbering from 20 up to 50, 60 or more, are led through a core tube via individual quills. Molten plastic insulating material is delivered to the exterior of the core tube, and surrounds the plurality of the conductor wires as they emerge from the core tube to enter the extrusion die. The aligned array of conductor wires and the molten plastic insulating material pass together through the extrusion die, which incorporates a cylndrical die passage for each individual conductor wire, with web passages connectng the cylindrical passages to form a unitary ribbon cable extrusion emerging from the extrusion die. The guiding quills are individually removable from the core tube, in response to the actuation of automatic wire breakage sensing and alarm systems for quick replacement of a broken conductor wire by a new unbroken conductor wire. Fine adjustment of the extruded insulation thickness, and extremely sensitive positioning of the conductor wires within the cylindrical die passages, are both achieved by translational and rotational rocking adjustment movement of the extruder die within the housing, controlled by five separate adjustable set screws which permit the equalization of insulation thickness on all sides of all of the arrayed parallel conductor wires forming the ribbon cable extrusion.

9 Claims, 13 Drawing Figures

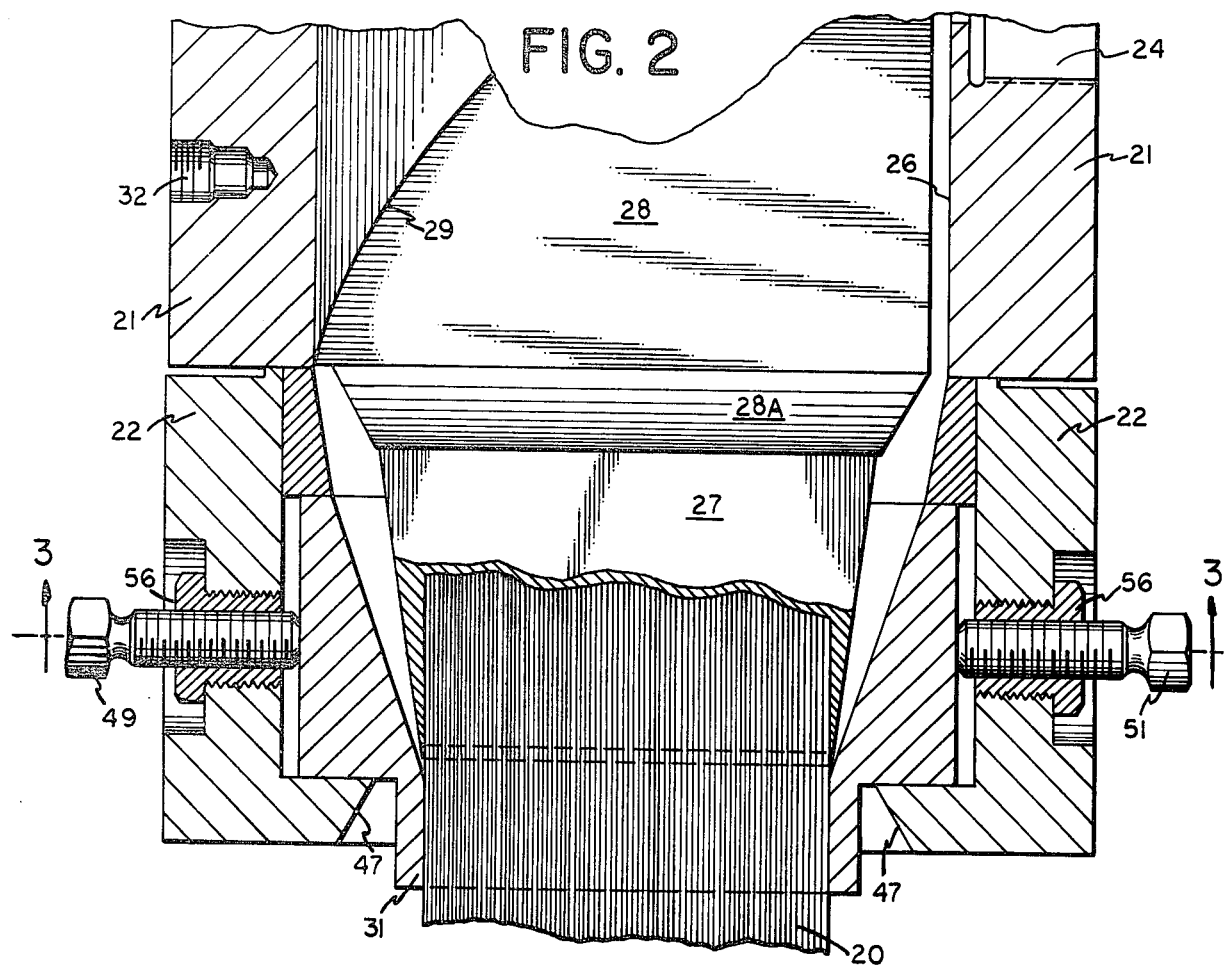
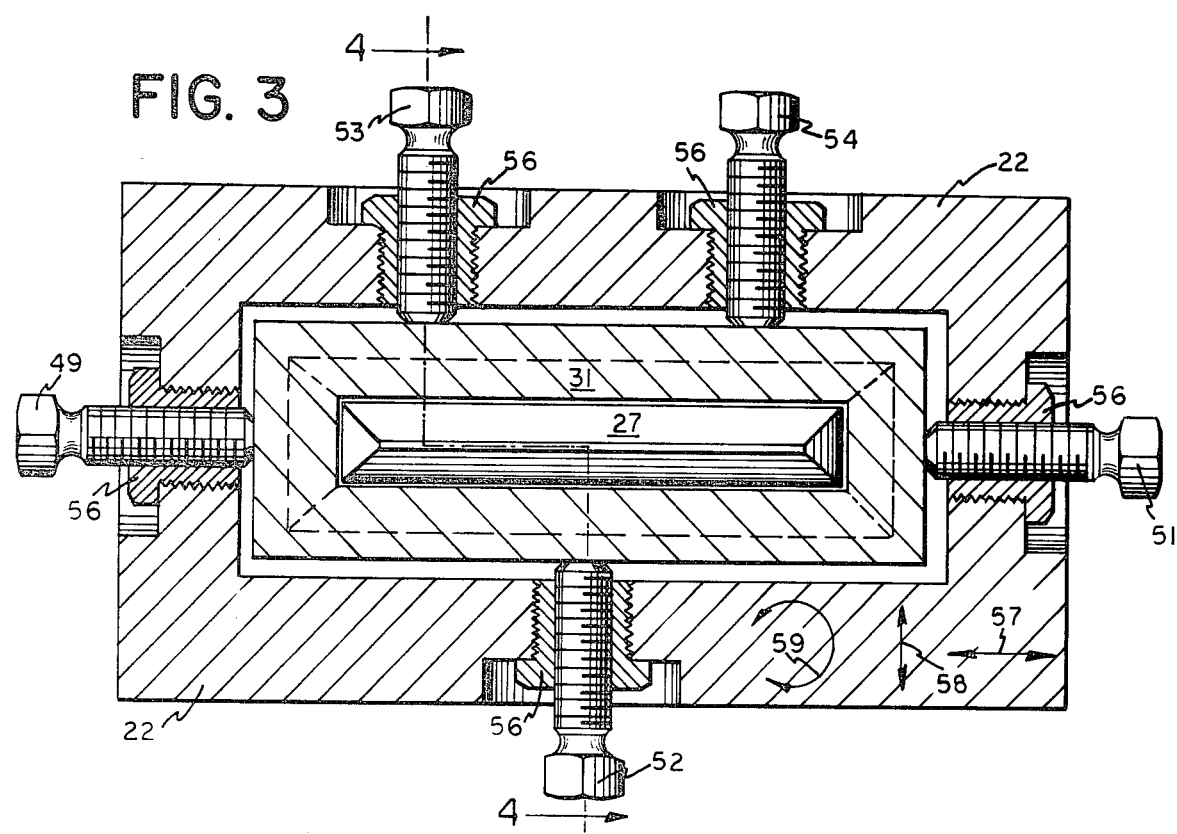

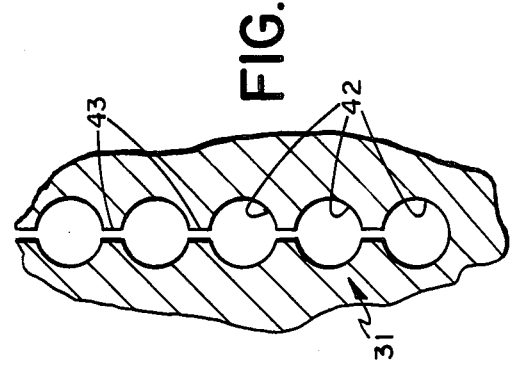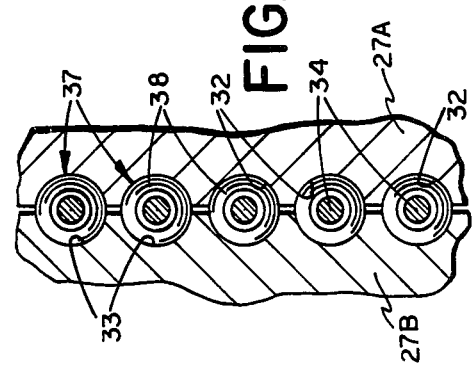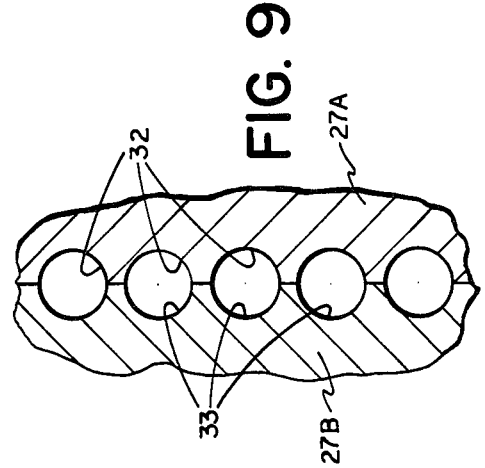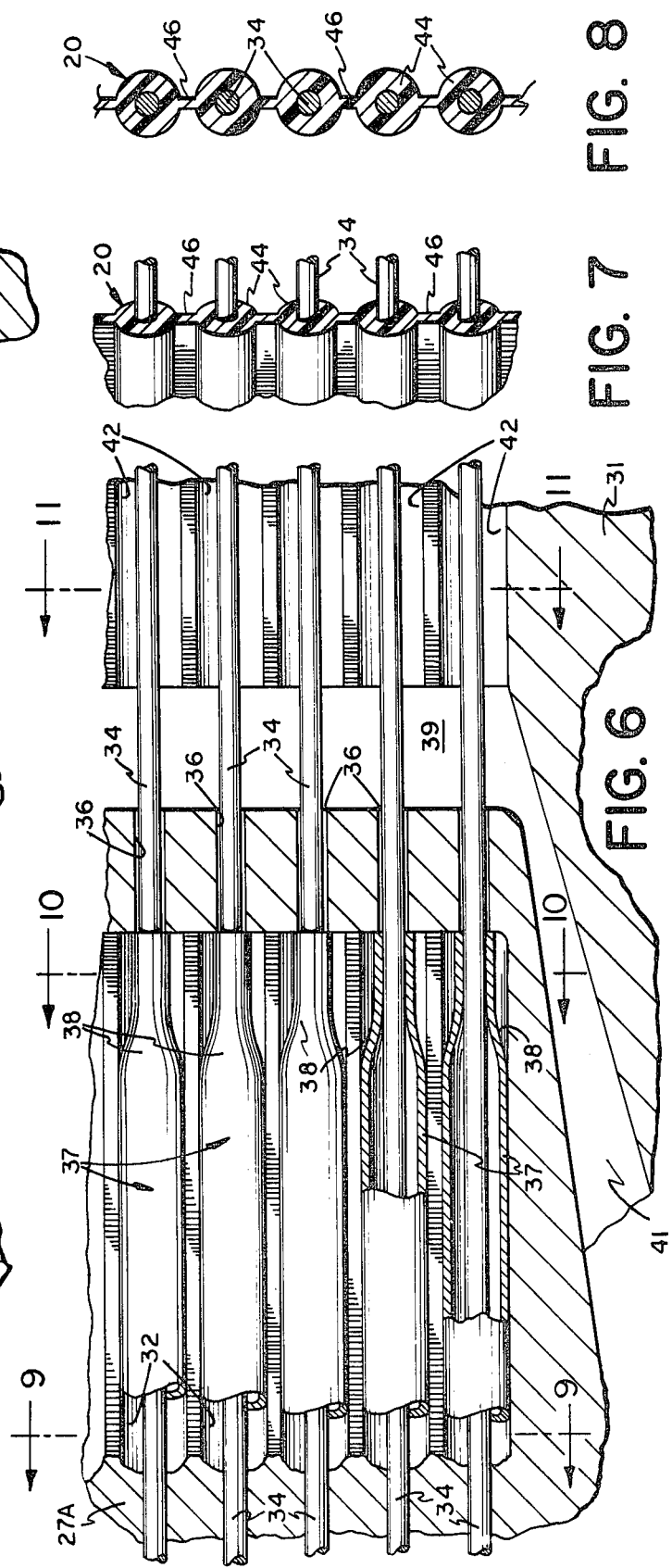

RIBBON CABLE EXTRUSION APPARATUS

This invention relates to extruded ribbon cables, and particularly to miniature ribbon cables having fifty, sixty or one hundred fine conductor wires, for example, having diameters of 0.010 to 0.015 inches encased in covering insulation having an outer diameter of 0.045 inches, for example. Miniature ribbon cables of this size may carry as many as fifty conductors arrayed over a total width of less than three inches, for example.

BACKGROUND OF THE INVENTION

Simultaneous extrusion of insulation and connecting webs joining pairs of insulated conductors to form an insulated joined conductor pair, easily traced through a cable, have now become relatively common in communication cable manufacturing, as exemplified by my patents U.S. Pat. Nos. 3,361,871 and 3,383,736. Over the past century, a number of proposals have been disclosed in issued United States Patents for extrusion of multi-conductor cables: U.S. Pat. Nos. 9,989; 1,500,546; 2,628,998; 2,979,431; 3,728,424; and 3,757,029 are all examples of such patents.

The extrusion die assembly apparatus illustrated and described in these patents has not proved effective in the extrusion of miniature ribbon cables incorporating extremely fine conductor wires. Accordingly, a significant need has developed for methods and apparatus capable of producing extruded ribbon cable in fine miniature sizes.

Wire breakage has proved to be a difficult problem, since one broken wire destroys the effectiveness of the entire ribbon cable, and until it is discovered and a new unbroken wire is introduced, a long span of defective cable can be produced by conventional extruding apparatus. Even after the broken conductor is discovered, the threading insertion of a new fine conductor wire through the die is a nearly insurmountable problem.

Furthermore, in ribbon cables incorporating extremely fine conductor wires, a comparably thin layer of insulation is desired to reduce the size and weight of the final extruded cable. With conventional extrusion dies, however, the desired minimum insulation thickness requires highly critical positioning of the conductor wires within the extrusion die, since a slight displacement of the conductor wires toward one surface of the extruded ribbon cable can reduce or totally eliminate the thin insulation layer from that side of the cable. Interconductor capacitance producing "cross-talk" in communication cables is best minimized by uniform spacing and uniform insulation of the ribbon cable conductors, and high quality miniature ribbon cable has not been available in the past because these manufacturing problems have remained unsolved.

SUMMARY OF THE INVENTION

In the methods and apparatus of the present invention, a core tube of unique shape and design is securely anchored inside a die housing and provided with flow-guiding deflector channel walls directing the advancing fluid plastic insulation material along the core tube in the direction of the extrusion die. The advancing fluid plastic material is evenly distributed across both sides of the flat arrayed plurality of conductor wires which are moved endwise through the core tube inside tubular quills preferably having necked-down exit portals. These quills are arrayed side-by-side across the width of the central flat cavity inside the core tube, and they are anchored in position but easily removable to facilitate the substitution of a fresh unbroken conductor wire in place of a previously broken wire. Preferably, automatic sensing systems are employed to detect the presence of any conductor break at any point across the cable, stopping the extrusion process until the required new conductor quill is positioned inside the core tube. By this means, the length of a defective extruded ribbon cable is minimized or practically eliminated, achieving important cost savings. Since a single broken conductor wire makes the entire ribbon cable defective, the instant sensing of a break and the prompt substitution of a new conductor wire are desired to save manufacturing time, labor, materials and expense.

An adjustably maneuverable ribbon cable die is movably positioned closely adjacent to the core tube exit. Like the core tube, the extrusion die is formed with an arrayed plurality of cylindrical die passages, and in the die, these are connected by web passages. Each die passage is positioned to receive a single conductor wire passing therethrough, together with the hot fluid plastic insulating material to be extruded thereon. The web passages connect adjacent cylindrical die passages, forming a continuous integral extruded width of insulating material, with the arrayed plurality of conductor wires embedded therein in precise spaced relationship.

The extrusion die is maneuverable in both X translation and Y translation across the cross-sectional plane of the ribbon cable, and it may also be rocked clockwise or counter-clockwise in the same plane by adjustment of three opposite and offset rocking set screws. This combination of translation and rocking rotational adjustment provides extremely precise positioning of the die relative to the core tube, providing fine tuning compensation for dimensional variations, progressive warpage or similar factors. The consequent accurate positioning of the conductor wires relative to the extruded insulation produces uniform insulation of minimum thickness around all of the spaced plurality of conductor wires across the entire width of the extruded ribbon cable.

OBJECTS OF THE INVENTION

Accordingly, a principal object of the present invention is to provide economical methods and apparatus for extruding insulated ribbon cable arrays of large pluralities of parallel conductor wires formed together in a single wide ribbon.

Another object of the invention is to provide methods and apparatus of this character incorporating a core tube assembly having a plurality of removable and replaceable quills, through each of width an individual fine conductor wire is delivered to the extrusion die.

Still another object of the invention is to provide such methods and apparatus capable of forming miniature insulated ribbon cable of high quality having uniform insulation thickness across its width and around all sides of each conductor wire.

A further object of the invention is to provide such methods and apparatus capable of minute adjustment of insulation thickness in the final extruded ribbon cable.

Still another object of the invention is to provide such ribbon cable extrusion methods and apparatus incorporating both translational and rocking rotational adjustment between the extrusion die and the core tube.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

THE DRAWINGS

For a fully understanding of the nature and objects of the invention, reference should be had to the following detailed description taken in conjunction with the accompanying drawings, in which:

FIG. 2 is a cross-sectional plan view of the assembly shown in FIG. 1, taken along a central transverse plane along which the large arrayed plurality of conductor wires are delivered through the core tube quills to the extrusion die;

FIG. 3 is a transverse cross-sectional elevation view of the adjustably maneuverable extrusion die, taken along the plane 3—3 shown in FIG. 2, illustrating the X and Y translations and the rocking rotations which may be employed by maneuvering five different set screws to achieve precise minute relative adjustments of extrusion die and core tube;

Figure 4:
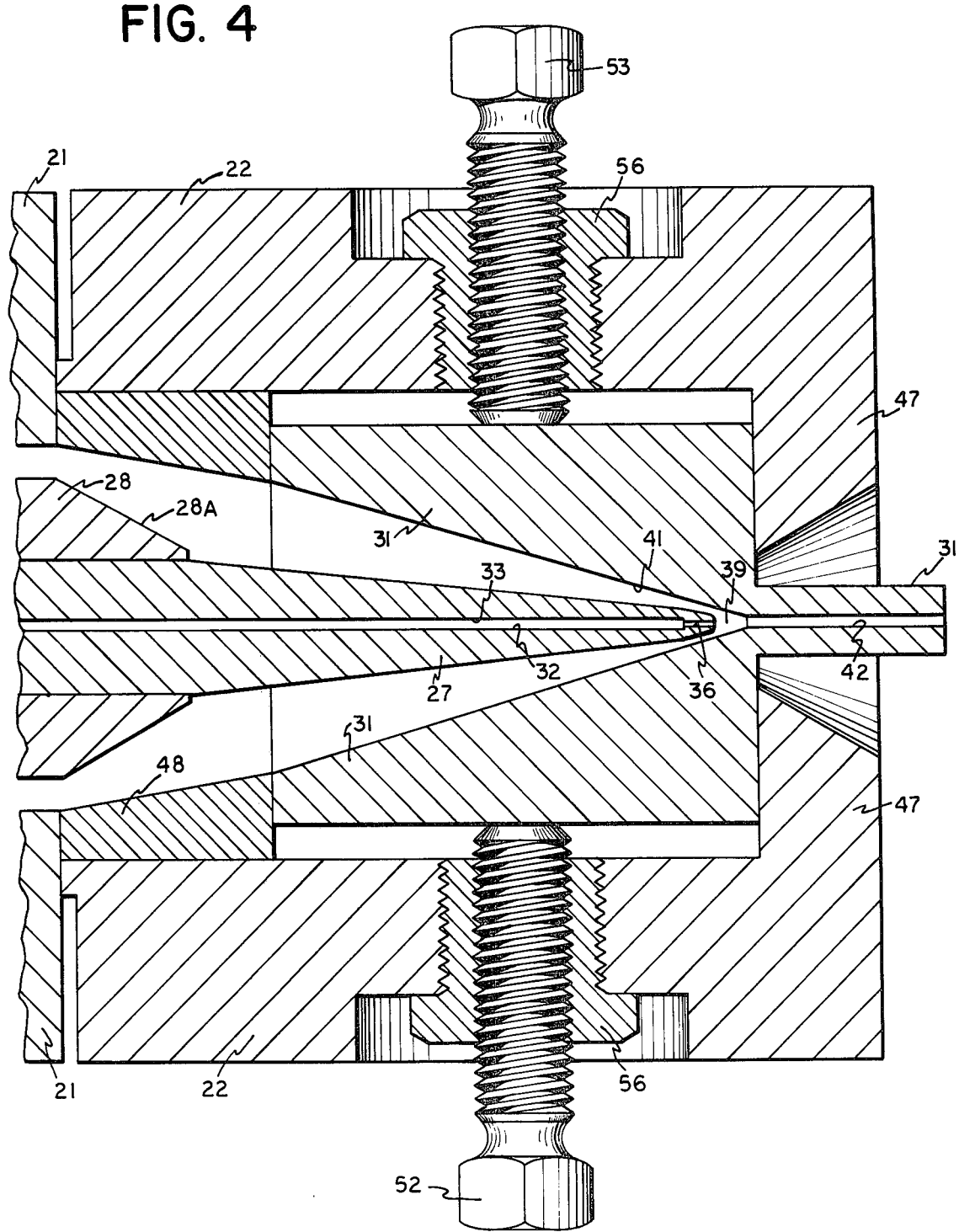
FIG. 4 is an enlarged axial cross-sectional elevation view, taken along the offset plane 4—4 shown in FIG. 3, illustrating the close juxtaposition of the extrusion die and core tube and their relative adjustable maneuverability.
Figure 5:
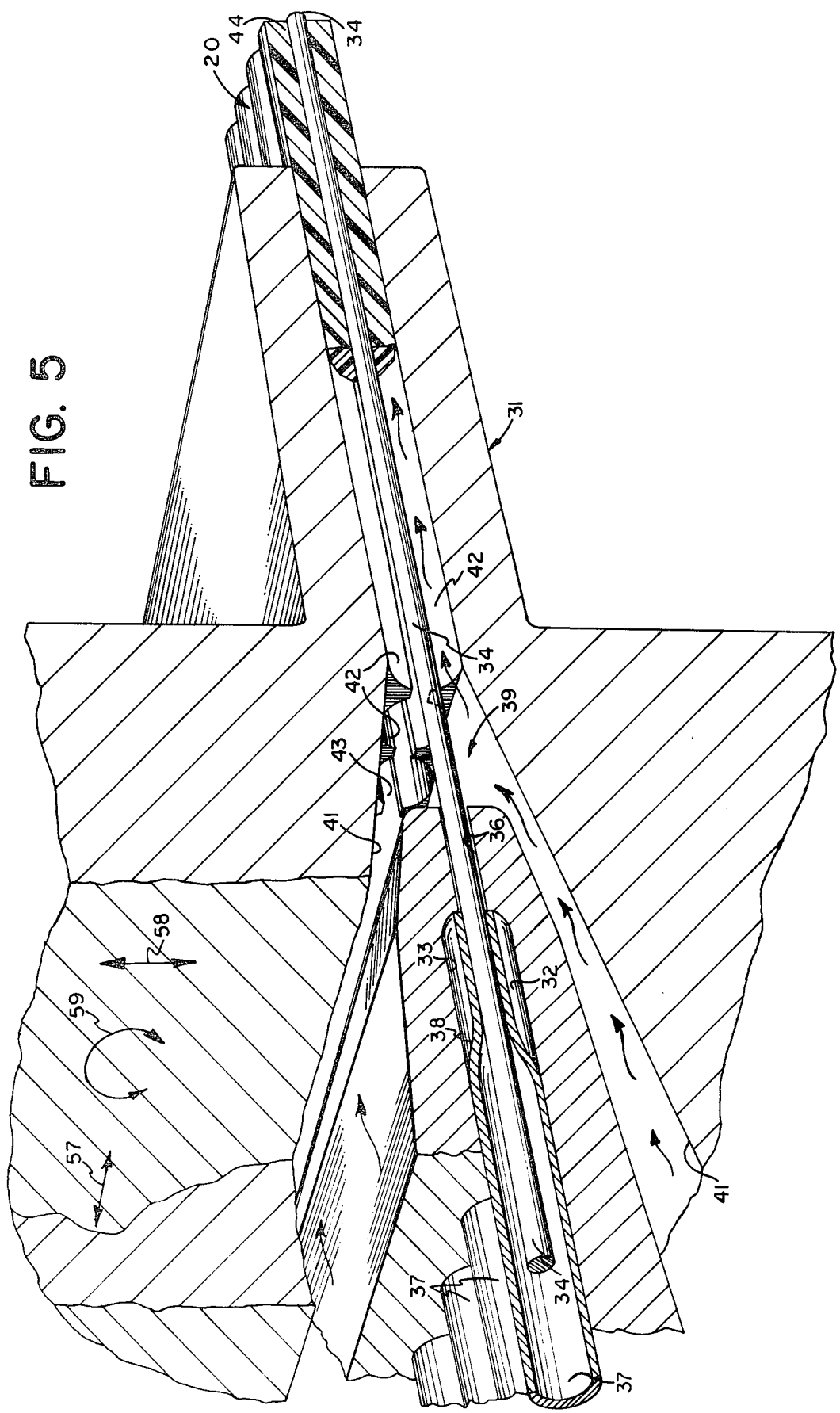

FIG. 5 is a greatly enlarged fragmentary axial cross-sectional perspective elevation view, corresponding generally to FIG. 4, and showing in greater detail the juxtaposition of the quill core tube assembly with the extrusion die receiving the arrayed fine parallel conductor wires and the fluid insulating plastic coating material for extrusion together through the die to form the extruded ribbon cable product.

FIG. 6 is a greatly enlarged cross-sectional plan view taken along the same plane as that of FIG. 2 and showing the same juxtaposed core tube quill assembly and extruding die as seen in FIG. 5.

FIG. 7 is a greatly enlarged fragmentary plan view of a portion of the extruded ribbon cable produced by the extruding methods and apparatus of the present invention;

FIG. 8 is a greatly enlarged transverse cross-sectional elevation view of the extruded ribbon cable shown in FIG. 7;

FIGS. 9, 10 and 11 are successive greatly enlarged transverse cross-sectional elevation views taken along the successive transverse planes 9—9, 10—10, and 11—11 in the juxtaposed assemblies illustrated in FIG. 6 to show successive cross-sectional elevations of the extrusion apparatus of the invention.

Figure 12:
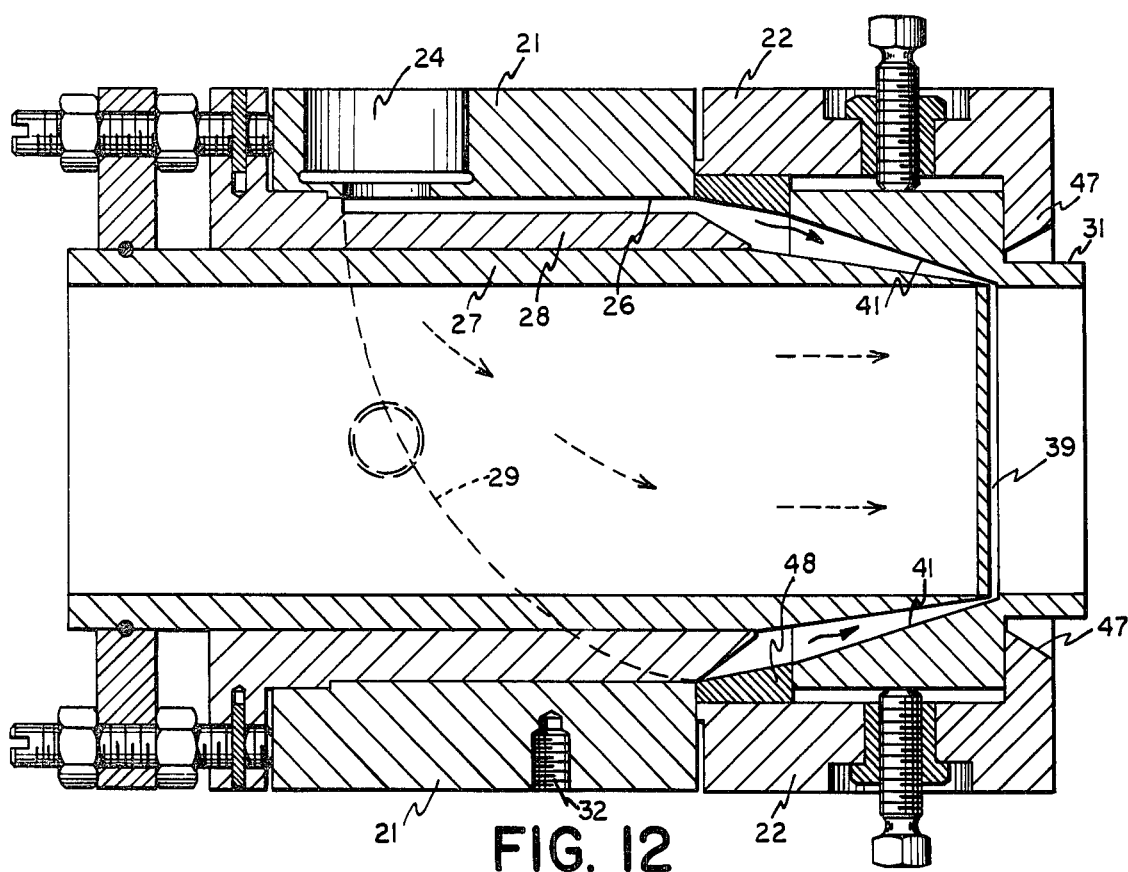
Figure 13:
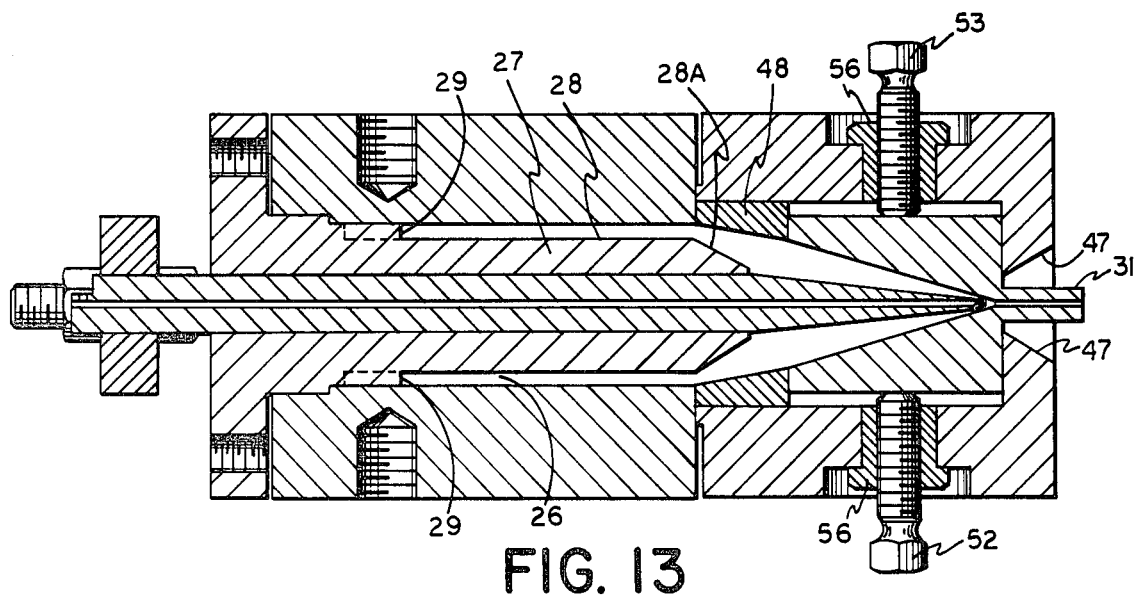

FIG. 12 is a cross-sectional top plan view of the assembly of FIG. 2, taken along the line 12—12 in FIG. 3, showing the interior of the core tube and deflector; and FIG. 13 is an axial cross-sectional elevation view of the assembly taken along the line 4—4 in FIG. 3, showing the wire guiding quills removably positioned inside the core tube.

EXTRUSION DIE ASSEMBLY

Figure 1:
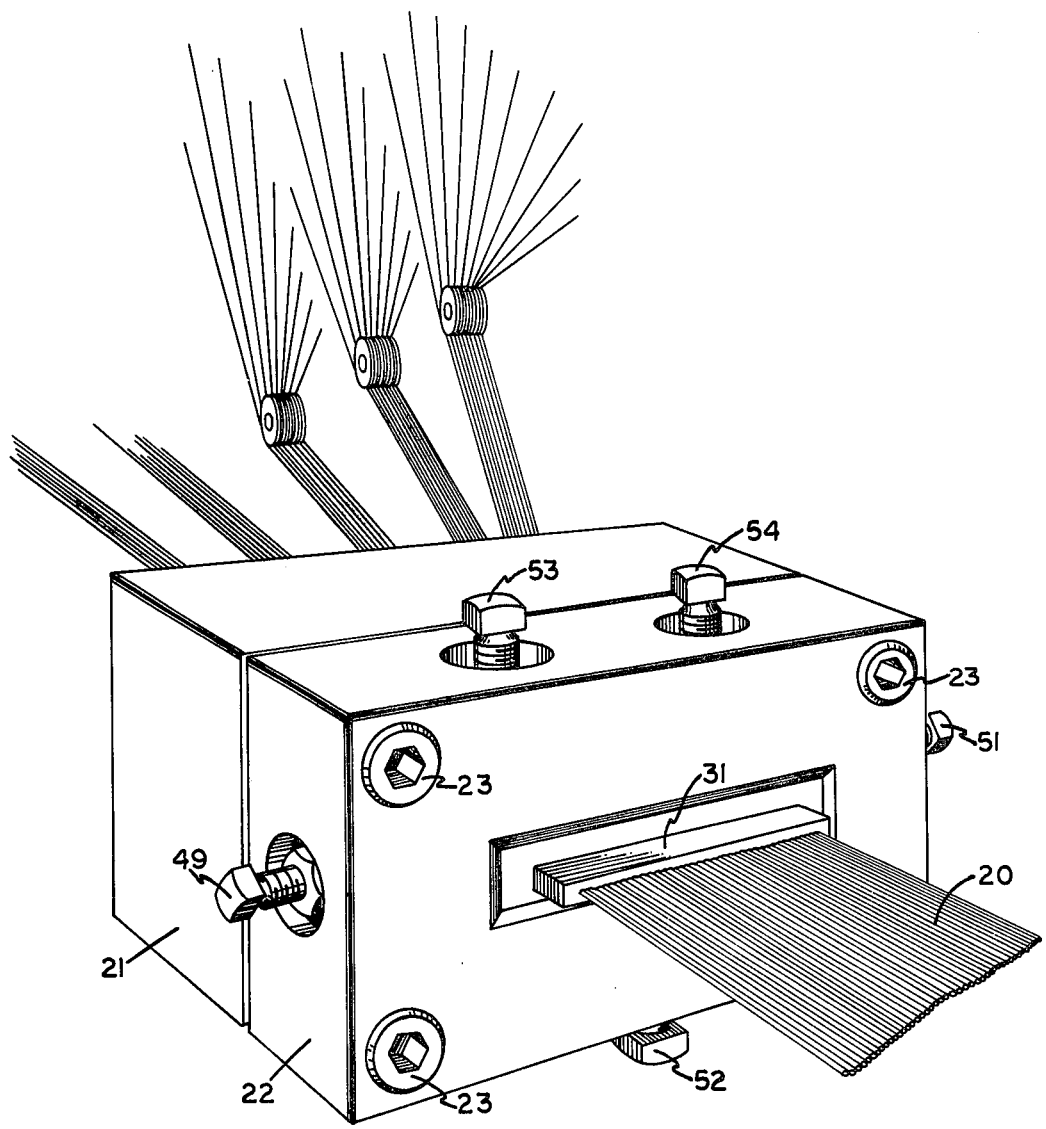
FIG. 1 is a schematic perspective view of a ribbon cable extrusion die assembly of the present invention showing a large plurality of conductor wires delivered to the extrusion die assembly where they are combined with the fluid insulating polymer coating material to form the extruded ribbon cable product emerging from the die assembly.

As indicated in FIG. 1, the extrusion die assembly, in which the large plurality of arrayed parallel conductor wires are embedded in an extruded insulating coating forming a unitary ribbon cable 20, is enclosed inside a barrel body 21 on the forward exit end of which is mounted a die holder 22 connected to the barrel body 21 by longitudinal edge corner bolts 23. The barrel body 21 is provided with a plastic entrance portal 24 through which fluid insulating polymer coating material such as molten polyethylene is introduced. Portal 24 opens into an internal elongated longitudinal cavity 26 passing lengthwise through the entire length of the barrel body 21 and a core holder 27 of rectangular tubular cross-section is positioned inside cavity 26 within a mating rectangular tubular deflector 28.

As indicated in FIG. 2 and also in FIGS. 12 and 13, the fluid insulating material entering plastic portal 24 flows along both sides of the deflector 28 being guided by the sweeping curve of the deflector ledges 29 formed on both flat lateral surfaces of the deflector 28 corresponding to the two wide faces of the extruded ribbon cable.

The divided flowing stream of molten plastic material is gradually turned and directed downstream toward the extrusion die 31 by deflector ledges 29, in a direction indicated by the various arrows shown in FIG. 2 and also in FIGS. 5, 12 and 13. The deflector 28 thus subdivides the advancing stream of fluid plastic insulating material into two major subdivisions, and directs these portions of the stream toward the extrusion die 31 in order to deliver them to the extrusion die to form the insulation of the extruded ribbon cable, with a uniform thickness of the layer of insulating material across the entire width of the cable.

As indicated in the drawings, the deflector 28 is substantially rectangular in cross-section having a beveled or chamfered exit end 28A converging toward the core tube 27.

The barrel body 21 positioning the extrusion assembly is anchored upon suitable support means threadedly engaged with a support socket 32 shown in the FIGURES, and serving to align the extrusion assembly positioned within barrel body 21 with the advancing wire feed paths and the take-up reel equipment drawing the extruded ribbon cable away from the extrusion assembly for storage, packaging and shipping. Securely bolted inside the deflector 28 is the core tube 27, rectangular in cross-section and positioned to receive and guide the advancing conductor wires toward the extrusion die 31.

CORE TUBE

Preferably, the core tube 27 is formed in two facing halves, whose facing surfaces are milled in complementary facing grooves arrayed in parallel mating fashion along the entire internal length of the core tube. Thus, as indicated in FIG. 9, the core tube 27 may be formed of two halves 27A and 27B incorporating facing aligned parallel grooves 32 and 33.

As shown best in FIGS. 5 and 6, the extrusion die ends of the grooves 32 and 33 lead the advancing conductor wires 34 to delivery portals 36 only slightly larger in internal diameter than the external diameter of the wire 34. Tubular guide sleeves or quills 37 best shown in FIGS. 5 and 6 are positioned within the facing complementary grooves 32 and 33 to facilitate the threading insertion of each of the wires 34 within the core tube 27. As shown in FIGS. 5 and 6, the quills 37 are formed of thin-walled tubular material, such as hypodermic needle stock, and their delivery ends are preferably swaged or necked-down at 38 to reduce their internal diameter to a dimension very close to the external diameter of the wires 34, closely matching the internal diameter of delivery portals 36, and thus minimizing or eliminating reverse backflow of fluid plastic insulating material into delivery portals 36 or quills 37.

As best shown in FIGS. 5 and 6, each of the fine conductor wires 34 travelling through a quill 37 and a delivery portal 36 emerges therefrom into an entrance chamber 39 between the tapered tip end of core tube 27 through which all of the delivery portals 36 open, and the converging entrance walls 41 of the extrusion die 31, which converge at an acute angle as shown in FIGS. 4 and 5 to merge with the cylindrical conductor passages 42 of the extrusion die 31, each of which accommodates a conductor 34 passing centrally down its longitudinal axis, as shown in FIG. 5 and FIG. 6.

As indicated in the cross-sectional elevation view of FIG. 11, the cylindrical conductor passages 42 are joined by a series of intervening web passages 43 forming the "bead chain" or "string of pearls" shaped extrusion die opening shown in the cross-sectional elevation view of FIG. 11.

The fine conductor wires 34 are all drawn through the respective cylindrical conductor passages 42 of the extrusion die 31 in a central co-axial relationship by a suitable take-up reel guide means not shown in the drawings, and the ribbon cable 20 emerging from the extrusion die 31 encloses the conductor wires 34 in an insulating jacket of the extruded polymer insulation material forming a thin uniform insulating layer 44 around each conductor, all joined together by thin webs 46 of the same insulating material.

ADJUSTABLE ALIGNMENT OF EXTRUSION DIE

Extremely fine adjustment or "fine tuning" of the position of the extrusion die relative to the delivery portals 36 in the exit end of core tube 27 is provided by the plurality of adjustable set screws shown in FIGS. 2, 3, and 4. These set screws captively position the extrusion die 31 relative to the barrel body 21 and die holder 22 within which core tube 27 is solidly anchored. Extrusion die 31 is positioned behind the inturned forward flanges 47 of the die holder 22 and slidingly sandwiched between flanges 47 and a wedge ring 48, and free for sliding movement in a lateral plane.

The lateral positioning of extrusion die 31 is governed by a pair of lateral set screws 49 and 51. Elevational adjustment of the extrusion die and rocking rotational adjustment are governed by three additional set screws, a fulcrum set screw 52 on the underside of the extrusion die 31 and a pair of upper rocking set screws 53 and 54 laterally offset from the axis of the fulcrum set screw.

All of these five set screws are threaded into bushings mounted in suitable apertures in the die holder 22. The heads of the set screws are shaped to be torqued into place by suitable wrenches, and square-headed set screws are illustrated in the drawings. The threaded shanks of all five of these set screws thus extend through their mounting bushings 56, protruding into the interior of die holder 22 into abutting engagement with the outer surfaces of the extrusion die 31.

Loosening of lateral set screw 49 and the tightening of lateral set screw 51 for example will move extrusion die 31 slidingly to the left in FIG. 3, since it is slidingly captive between wedge ring 48 and inturned flanges 47 of die holder 22. Such leftward movement of extrusion die 31 of course has the effect of moving the entire "bead chain" outline of the outer surface of the extruded ribbon cable 20 to the left relative to the fine conductor wires 34, resulting in slightly thicker insulation layers 42 on the left side of conductors 34 and slightly thinner insulation layers 42 on the right side of conductors 34.

Slight loosening of fulcrum set screw 52 and tightening of both rocking set screws 53 and 54 moves the extrusion die 31 slidingly downward toward fulcrum set screw 52 when viewed in FIG. 3, producing thinner insulation layers 42 on the upper sides of conductors 34, and slightly thicker insulating layers on the lower sides of conductors 34.

Slight rocking, tilting adjustment of the extrusion die 31 may also be produced by loosening rocking set screw 54 and tightening rocking set screw 53 for example to produce a counter-clockwise pivoting rocking adjustment motion, as viewed in FIG. 3. The opposite adjustment of set screws 54 and 53 will produce clockwise rocking adjustment of extrusion die 31.

Extremely fine tuning of the outer contour of the insulated jacket of ribbon cable 20 emerging from the extrusion die 31 is thus achieved, assuring the desired maximum uniformity of thickness of the thin polymer insulation layer being extruded on all sides of each of the conductors 34.

In a typical installation, the total thickness of ribbon cable 20 is 0.045', for example, and the center to center spacing of conductors 34 is 0.053". The quills 37 positioned within the core tube 27 are 0.041" outside diameter and 0.028" inside diameter, resting in grooves 32 having an inside diameter of 0.042". The necked-down ends of quill tubes 37 have 0.028" outside diameters and 0.016" inside diameters, for example, and delivery portals may have a comparable inside diameter of about 0.016". These dimensions easily accommodate fine conductor wires of 0.015" in outside diameter when axially centered concentrically within the cylindrical conductor passages 42 of extrusion die 31. The insulating layer 42 surrounding the conductors 34 is typically about 0.15" in thickness. Web portions 46 of the extruded ribbon cable 20 may be from 0.005" to 0.010" in thickness, and about 0.008" in width, for example.

The plural set screw adjustment mechanism illustrated in FIGS. 2, 3 and 4 permits extremely fine thickness adjustments in insulating layers 42, on the order of fractions of a thousandth of an inch, for example. By this means, extremely high quality ribbon cable can be extruded in the methods and apparatus of this invention in micro-miniature sizes with extremely fine conductor wires highly suitable for micro-computer and large scale integrated circuit harnesses and connections.

The desired temperatures of fluid polymer insulating material, introduced through plastic portal 24 and travelling past deflector 28 through entrance chamber 39 and the passages 42 and 43 formed in extrusion die 31, is conveniently maintained by suitable heating means such as Calrod heating jackets embracing barrel body 21 and die holder 22.

The extrusion die 31 is thus adjustable in three different modes of travel in a lateral plane, as is indicated in FIGS. 3 and 5 by three double-headed arrows: rightand-left lateral adjustment 57, up-and-down vertical adjustment 58 and clockwise-or-counter-clockwise rocking motion 59.

Extrusion die 31 thereby cooperates synergistically with the conductor wire delivery device comprising quills 37 in core tube 27, moving the arrayed plurality of fine wires into entrance chamber 39 and through passages 42 in extrusion die 31 with high precision and reliability, embedding the arrayed conductors within a thin, uniform insulating jacket webbed to form a miniature ribbon cable 20 emerging from die 31.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A ribbon cable extrusion die assembly for encapsulating an arrayed plurality of fine conductor wires with plastic insulation, comprising:
   (A) a hollow housing enclosing a longitudinal bore having
      (a) a width substantially exceeding its height,
      (b) an entrance end, and
      (c) an extrusion end opposite the entrance end;
   (B) a low flat hollow core tube having a width substantially exceeding its height, extending from the entrance end of the bore inside the bore and incorporating
      (a) a wire receiving end for receiving the arrayed plurality of fine conductor wires, and
      (b) wire delivery portal means
         (1) formed at the opposite end from the wire receiving end,
         (2) dimensioned to accommodate the arrayed plurality of fine conductor wires led through the core tube, and
         (3) opening into the bore,
   (C) plastic delivery means incorporating
      (a) a plastic inlet portal communicating with the bore, and
      (b) a plastic guiding cavity formed between the bore and the core tube and positioned to deliver flowing molten plastic insulating material from the inlet portal to the extrusion end of the bore,
   (D) an extrusion die
      (a) positioned inside the extrusion end of the bore in close juxtaposition with the core tube, and
      (b) having extrusion passage means dimensioned to accommodate the arrayed plurality of fine conductor wires, and
   (E) a plurality of removeable elongated quill tubes laterally arrayed side by side across the interior of the core tube and extending substantially the entire length thereof, with each of said quill tubes
      (a) encircling one of the fine conductor wires and guiding the wire from the wire-receiving end of the core tube to the wire delivery portal means of the core tube, and
      (b) installed through the wire-receiving end of the core tube for rapid removal from the core tube for replacement of a broken wire,
   whereby each of the fine conductor wires entering the core tube is easily replaced when broken merely by removing its quill tube and replacing the quill tube with the wire contained therein.

2. The extrusion die assembly defined in claim 1, wherein each of the quill tubes is positioned in a shallow groove formed in the interior of the core tube.

3. The extrusion die assembly defined in claim 2, wherein each shallow groove terminates in a wire delivery portal closely embracing the fine wire conductor delivered therethrough to block reverse flow of molten plastic insulating material.

4. The extrusion die assembly defined in claim 1, wherein each of the quill tubes has an inside diameter substantially larger than the fine conductor wire over a major part of its length, with a reduced exit inside diameter closely embracing the fine conductor wire at the exit end of the quill tube.

5. A ribbon cable extrusion die assembly for encapsulating an arrayed plurality of fine conductor wires with plastic insulation, comprising:
   (A) a hollow housing enclosing a longitudinal bore having
      (a) a width substantially exceeding its height,
      (b) an entrance end, and
      (c) an extrusion end opposite the entrance end;
   (B) a low flat hollow core tube having a width substantially exceeding its height, extending from the entrance end of the bore inside the bore and incorporating
      (a) a wire receiving end for receiving the arrayed plurality of fine conductor wires, and
      (b) wire delivery portal means
         (1) formed at the opposite end from the wire receiving end,
         (2) dimensioned to accommodate the arrayed plurality of fine conductor wires led through the core tube, and
         (3) opening into the bore,
   (C) plastic delivery means incorporating
      (a) a plastic inlet portal communicating with the bore, and
      (b) a plastic guiding cavity formed between the bore and the core tube and positioned to deliver flowing molten plastic insulating material from the inlet portal to the extrusion end of the bore, and
   (D) an extrusion die
      (a) positioned inside the extrusion end of the bore in close juxtaposition with the core tube,
      (b) having extrusion passage means dimensioned to accommodate the arrayed plurality of fine conductor wires, and
      (c) cooperatively engaged with adjustment means for moving the extrusion die as an integral unit in a plurality of directions in a plane transverse to the axes of the fine conductor wires for accurately positioning the extrusion passage means in precisely aligned juxtaposition to the wire delivery portal means of the core tube,
   whereby the extrusion passage means is accurately adjustable with respect to the arrayed plurality of fine conductor wires to assure the production of a ribbon cable with the wires concentrically surrounded by the desired thickness of plastic insulation covering the wires issuing from the extrusion die passage means, (E) and further including a plurality of removeable elongated quill tubes laterally arrayed side by side across the interior of the core tube and extending substantially the entire length thereof, with each of said quill tubes, (a) encircling one of the fine conductor wires and guiding the wire from the wire-receiving end of the core tube to the wire delivery portal means of the core tube, and (b) installed through the wire-receiving end of the core tube for rapid removal from the core tube for replacement of a broken wire, whereby each of the fine conductor wires entering the core tube is easily replaced when broken merely by removing its quill tube and replacing the quill tube with the wire contained therein.

6. The extrusion die assembly defined in claim 5, wherein the movable adjustment provides up-and-down adjustment and side-to-side adjustment.

7. The extrusion die assembly defined in claim 5, wherein the movable adjustment provides up-and-down adjustment, side-to-side adjustment and clockwise-and-counterclockwise rocking adjustment.

8. The extrusion die assembly defined in claim 5, wherein the extrusion die and the core tube are adjustably positioned relative to each other by at least two pairs of oppositely acting setscrews operatively connected therebetween.

9. The extrusion die assembly defined in claim 5, wherein the extrusion die is laterally embraced by an opposed pair of lateral setscrews rotatably mounted in the core tube-supporting housing, and is vertically embraced by a single setscrew opposed by two oppositely laterally offset setscrews rotatably mounted in the core tube-supporting housing, providing both vertical and rocking adjustment.

* * * * *

UNITED STATES PATENT AND TRADEMARK OFFICE
CERTIFICATE OF CORRECTION

PATENT NO. : 4,150,929
DATED : April 24, 1979
INVENTOR(S) : Adolf W. Brandt

It is certified that error appears in the above-identified patent and that said Letters Patent are hereby corrected as shown below:

In the Abstract, line 10, "cylndrical" should be
    --cylindrical--.

Column 2, line 53, "width" should be
    --which--.

Column 3, line 8, "fully" should be
    --fuller--.

Column 6, line 34, 0.045' should be
    --0.045"--.

Signed and Sealed this

Seventh Day of August 1979

[SEAL]

Attest:

LUTRELLE F. PARKER

Attesting Officer    Acting Commissioner of Patents and Trademarks